Aug. 1, 1933.  B. D. WELLS  1,920,284
WATER HEATER CONTROL
Filed March 17, 1930  3 Sheets-Sheet 1

Inventor
Burling D. Wells
By Wooster & Davis
Attorneys

Patented Aug. 1, 1933

1,920,284

UNITED STATES PATENT OFFICE 1,920,284

WATER HEATER CONTROL

Burling D. Wells, Danbury, Conn., assignor to Harvey Hubbell, Incorporated, of Bridgeport, Conn., a Corporation of Connecticut Application March 17, 1930. Serial No. 436,263

17 Claims. (Cl. 219—39.)

This invention relates to a water heater and control means therefor, and more particularly to an electric water heater of the instantaneous type and to the control means therefor, although the control means is not limited to use with an electric type of heater, but could be adapted for gas or other types of heaters. It is an object of the invention to provide an improved means for automatically turning on and off the heating means when a faucet is opened and closed.

It is also an object of the invention to provide an improved means for automatically regulating the temperature of the water flowing from the heater and maintaining this temperature substantially uniform.

With the foregoing and other objects in view, the invention consists in certain novel features of construction, combinations and arrangements of parts as will be more fully disclosed in connection with the accompanying drawings.

In these drawings

Figure 1:
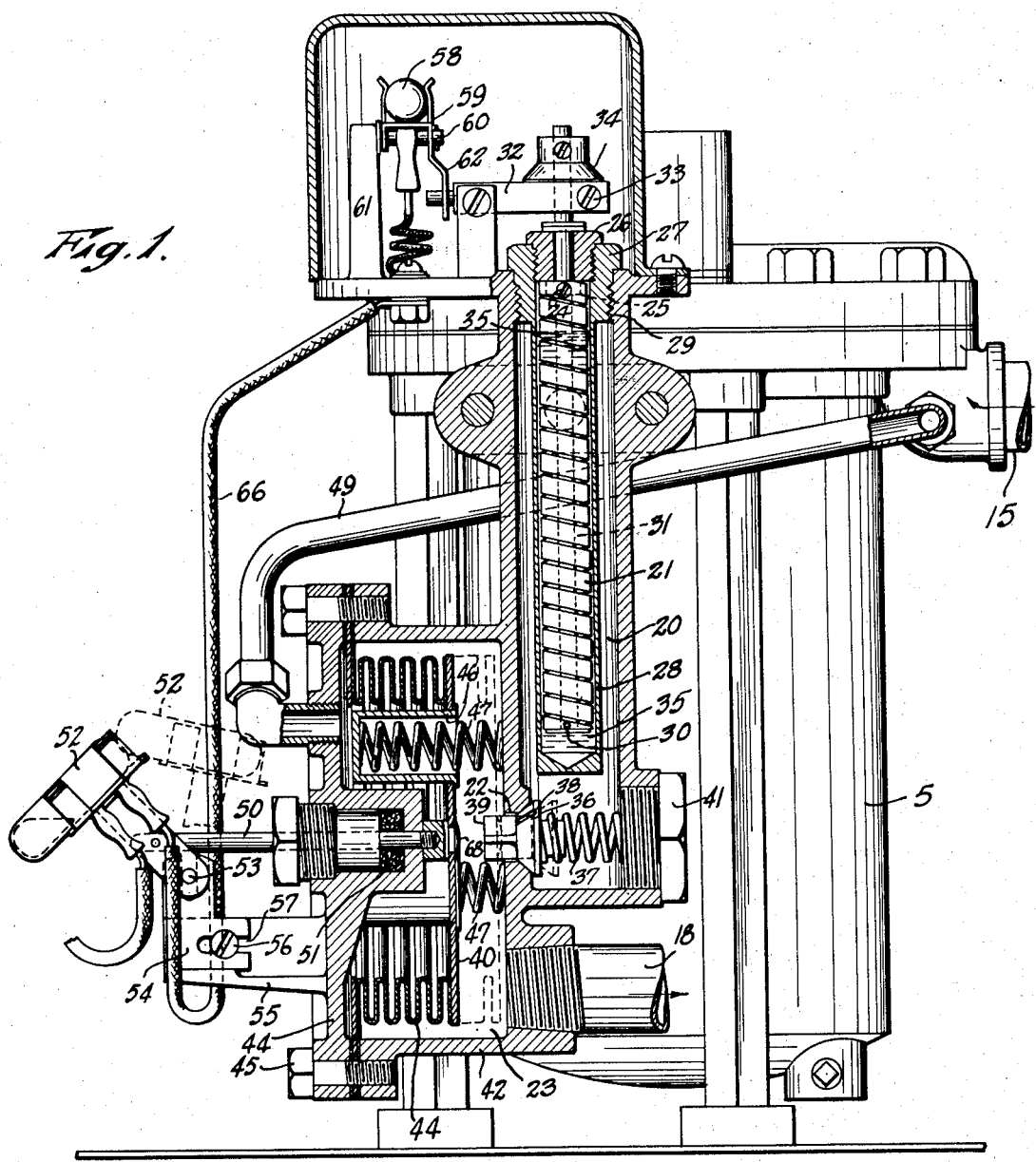
Fig. 1 is a partial side elevation and a partial section of my improved water heater.
Figure 2:
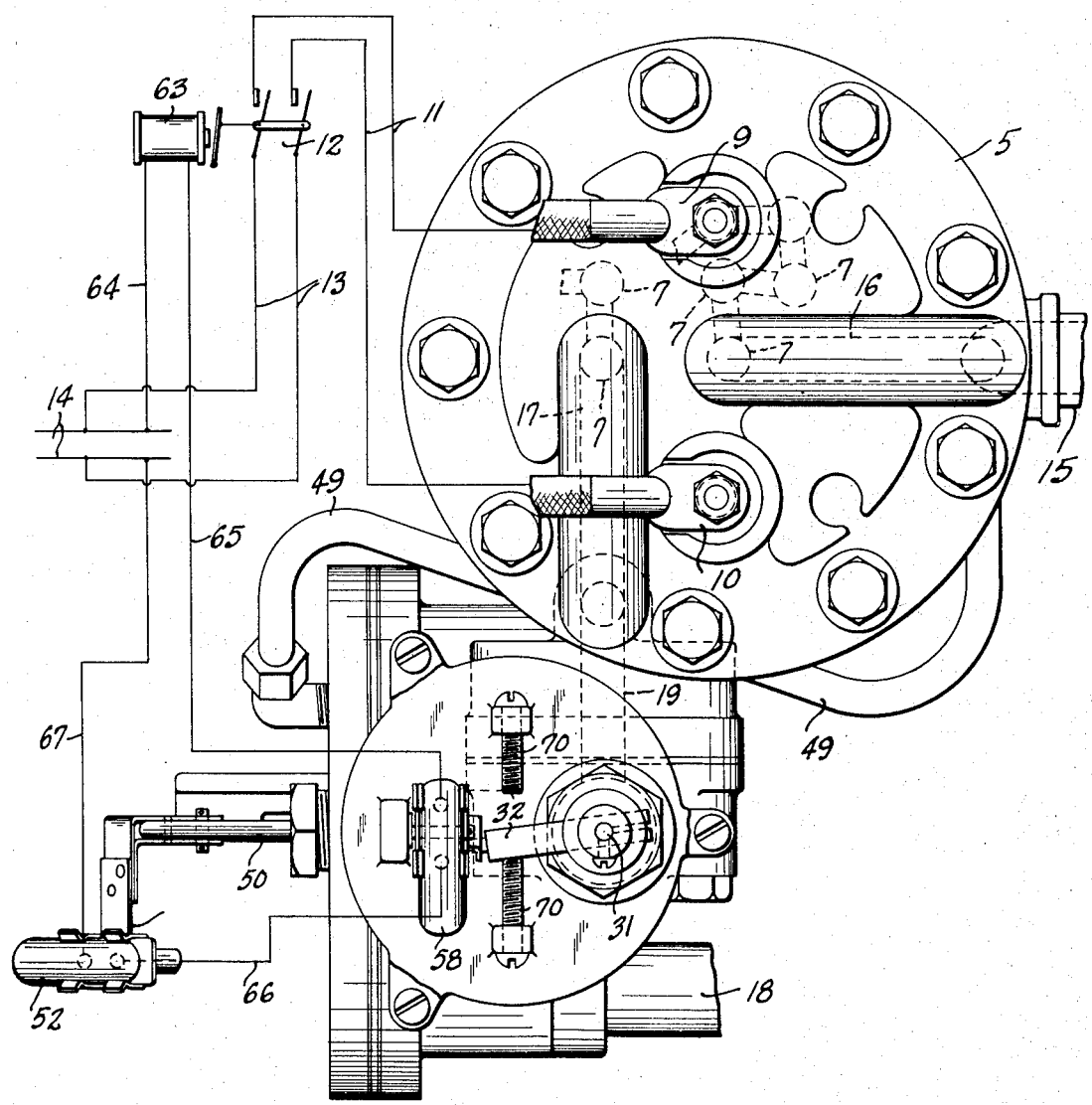
Fig. 2 is a top plan view thereof.
Figure 3:
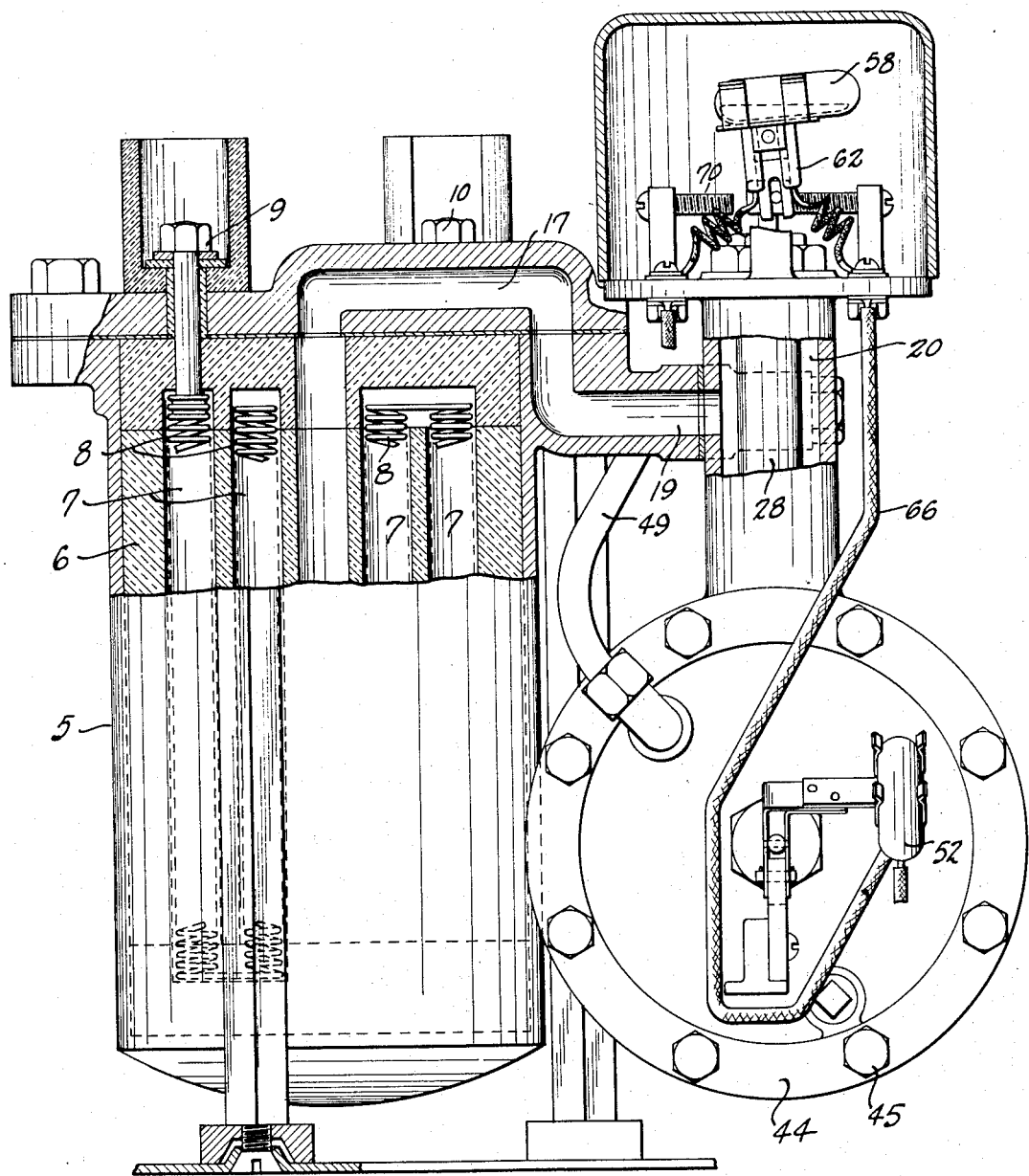
Fig. 3 is a partial section and a partial side elevation looking from the left of Fig. 1.

The heater illustrated comprises a casing 5 in which is located the heating means for water. In the present instance, this heating device is an electric heating means comprising resistance elements heated by an electric current, the water flowing over these elements and being heated thereby. The elements shown comprise insulating blocks 6 of porcelain or other suitable material having interconnected passages 7 through which the water flows and in which passages are located electrical heating resistance elements 8. In the present instance, the passages 7 are connected in series so that water flows through the device through these passages one after the other and about the electrical heating elements 8 so that the water is thoroughly heated as it leaves the heating device. It will, of course, be understood they may be otherwise connected as in parallel or in series parallel if found more desirable. The heating elements in the various passages may be connected in any manner desired, but in the present instance they are shown as connected in series. One lead connection to this element is shown at 9 and the other is shown at 10, and they are connected by the leads 11 to a control switch 12 and by leads 13 from this switch to the supply mains 14 from a suitable source of supply.

During the heating operation, water flows through this heating device, it being supplied to the heater from an inlet connection 15 connected to the usual house plumbing system, from which it leads by a passage connection 16 to the heating device and flows through the passage connection 17 from this heating device through my improved control mechanism which is in the outlet from the heater and from which it flows through the pipe connection 18 to any desired place of use, as for instance the hot water faucets in the house plumbing system. As the water flows from the heating device, represented as a whole by the numeral 5, it flows from the passage 17 through an outlet passage 19 to a passage 20 in which is located a temperature responsive device such as a thermostat 21, then flows through passage 22 into a chamber 23 and the outlet 19.

The thermostat 21 is preferably composed of a helically wound bi-metal strip, the two metals having different co-efficients of expansion so that if one end of the strip is held stationary, the other end will turn to correspond with the changes in temperature. This thermostat is secured at its upper end as by a screw 24 to an extension 25 on the lower end of the plug 26 threaded into the head 27 of a tubular casing 28 closed at its lower end. The head 27 is threaded as shown at 29 into the upper open end of the passage 20. The lower end of the thermostatic strip 21 is connected as indicated at 30 to a rod 31 passing through the plug 26 and carrying an arm 32 outside the casing. This arm is secured to the rod by any suitable means, but is preferably split and clamped on the rod by a clamping screw 33 so that it may be easily adjusted to the desired position on the rod. There may be mounted on the rod about the arm 32 a dial 34 graduated to indicate positions of adjustment for the arm 32 for different temperatures. The thermostatic element is mounted in a casing 28 and is surrounded by mercury 35 which is a good conductor of heat and, therefore, quickly conveys any change of temperature of the water in the passage 20 to the bi-metal element 21. Therefore, all the elements coming in contact with the mercury should be of metal which will not amalgamate with the mercury. The well or tube 28 may be of stainless steel as may also the rod 31, or they could be brass and the bi-metal element may be brass and steel.

The passage 22 between the passage 20 and the chamber 23 is normally closed by a valve 36 and preferably there is a spring 37 tending to hold this valve to its seat so as to insure the valve is normally closed. This valve is provided with a restricted passage 38 to equalize the pressures on opposite sides of the valve when flow of water is cut off. The valve has an extension 39 into chamber 23 in position to be engaged by the diaphragm 40 to open the valve 36 in a manner which will be presently described. A removable plug 41 may be provided in the wall of passage 20 to give easy access to the valve and spring.

In the chamber 23 is mounted a movable diaphragm 40, and in the present instance it includes a flexible bellows side wall 42 connected at its opposite end to the enclosing casing 43 by any suitable means. As shown, it is clamped between the end of the casing and the cap 44 by screws 45, there being suitable packings to prevent leakage. Mounted in the diaphragm 40 are suitable pockets 46 for coiled springs 47 pressing at one end against the bottom of the socket and against the opposite end against the wall 48 of the chamber. In the present instance there are three of these springs 47, but of course the number may be varied as desired. It will be evident that one side of the diaphragm 40 is exposed to the pressure in the chamber 23, but that the opposite side is cut off from this chamber. This latter side is connected by a bypass pipe 49 with the intake 15 to the heater. Therefore, when water is flowing from the heater, one side of the diaphragm, the right hand side as shown in Fig. 1, is subjected to the pressure of the outflowing water while the opposite side (through the bypass 49) is subjected to the pressure in the inlet pipe of the heater. A rod 50 is connected to the diaphragm 40 and moves with it, the rod being surrounded by a suitable stuffing box 51 to prevent leakage. The rod 50 is connected to any suitable type of switch 52, preferably a mercury switch, the support for this switch being pivoted at 53 of the bracket 54. This bracket 54 is adjustably mounted on a bracket arm 55 on the cap 44, the adjustment being secured through a clamping screw 56 threaded into the arm 55 and passing through a slot 57 in the bracket 54. By loosening the screw 56, the bracket 54 and the switch 52 can be adjusted toward and from the diaphragm and thus located at a proper location relative thereto, and thus, the movements of the switch by the diaphragm adjusted to the timing desired.

A second switch 58, also preferably a mercury switch, is mounted to be operated by the thermostat 21 through the arm 32. Thus the switch may be carried in a suitable support 59, pivoted on a pin 60 carried by an upright support 61. The support 59 may have a depending arm 62 which is forked to receive the end of the arm 32. Thus, as the arm 32 swings back and forth under the action of the thermostat the switch 58 is shifted to open and close the circuit. Movements of the arm 32 in opposite directions may be limited by stops 70.

The main switch 12 for controlling the current to the heating device is operated by a relay shown diagrammatically at 63. This relay is controlled by the two switches 52 and 58 which are controlled by the diaphragm 40 and the thermostat 21 respectively. The two switches 52 and 58 are connected in series with the relay so that in order for the relay to function to close the switch 12, both switches 52 and 58 must be closed. The relay and the switches 52 and 58 are connected to the supply line 14, and as indicated on the drawing one lead 64 to the relay is connected to one of the leads 14. The other lead 65 from the relay is connected to the switch 58. The two switches 58 and 52 are connected by a conductor 66, and the switch 52 is connected to the other side of the supply line 14 by the conductor 67.

*Operation.*—The elements are shown in the drawing in the positions they occupy when the faucets are all closed and no water is flowing through the heater. Should someone now open one of the hot water faucets, the pressure in the chamber 23 will drop as it is connected to the faucet through the pipe 18. This effect is positively secured by the valve 36 which, when closed, practically shuts off flow of water through the passage 20 to the chamber 23. Pressure of the water in inlet 15, however, is carried by the bypass 49 to the opposite side of the diaphragm 40 and, therefore, forces the diaphragm 40 to the right as viewed in Fig. 1 against the pressure of the springs 47. As the diaphragm moves toward the right, the head of the central rivet 68 hits the end of the projection 39 of the valve 36 and opens this valve as indicated in dotted lines. Thus, as the valve 36 is now open, water may flow through the heating device out the passage 20, through the passage 22 and the pipe 18 to the faucet. However, as the diaphragm 40 moves to the right it moves with it the rod 50 and swings the mercury switch to the right to the dotted line position of Fig. 1 closing the circuit through the switch. As normally at this time the water in the passage 20 is relatively cool, the thermostat 21 has shifted to throw the switch 38 to the closed position. This is the normal position of the switch 58 when no water is flowing unless the water in the passage 20 happens to be of sufficiently high temperature to open the switch 58. We will, however, assume that when the faucet was opened the switch 58 was in the closed position. It will then be obvious that as the diaphragm 40 was moved to the right by the differential pressures created on opposite sides thereof when the faucet was opened it moves the switch 52 to closed position, and as the switch 58 was already closed, the circuit was thus closed through the relay 63. This relay immediately closes the main switch 12 to heat the heating elements 18 in the heating device. Thus, as the water flows through the heating device it is heated and flows out the passage 19 in heated condition to the passage 20. If the water is too hot, that is, is heated beyond a certain given temperature, this temperature is immediately conveyed to the thermostat 21 by the mercury surrounding it and the thermostat swings the arm 32 to open the switch 58 and it remains open as long as the temperature of the water is above this given temperature. As soon as the temperature of the water falls below this desired temperature, the arm 32 is swung in the opposite direction by the thermostat to thus close the circuit through the relay and again cause the electric heating elements to function. Thus, the temperautre of the water is automatically kept within relatively close limits. This use of mercury surrounding the thermostatic element is very important in securing the desired temperature regulation. The mercury is a very good conductor of heat, and therefore, variations of temperature of the water flowing through the passage 20 is very quickly transferred to the bi-metallic element. It is old to surround thermostatic elements with oil or water, but these are poor conductors of heat, and where the element is surrounded by air, the effect is practically the same as where it is surrounded by water or oil as air is also a poor conductor of heat. In actual tests where the element 21 was surrounded by air the temperature in the outflowing water varied between 70 and 180 degrees, but with the use of mercury these temperatures varied only 12 degrees After the valve 36 has been opened by the diaphragm 40, the diaphragm is held in its position to the right and holds the valve 36 open by the differential pressures. The resistance of flow of the water through the heating device causes a sufficient drop in pressure between the inlet and outlet connections to and from this device to cause the diaphragm to remain in this position as long as water is flowing. Thus, as soon as the faucet is opened, the main switch is automatically closed to immediately begin heating of the water and the temperature of the outflowing water is maintained substantially constant by the thermostat 21. The end of the extension 39 on the valve 36 is preferably normally spaced from the diaphragm 40 when the water is not flowing. Thus, the diaphragm has gained a certain momentum before engaging the extension 39 and thus hits it a blow which insures opening of the valve. This is the preferred construction, although it is not necessary. The differential pressure on diaphragm 40 is always great enough to overcome the pressure tending to hold valve 36 to its seat whenever water is flowing through the heater, but if this control device is used with a heater in which there is very little or no pressure drop through the heater itself this space between the diaphragm and the inner end of the valve 36 is very desirable as tending to give more reliable operation and more surely overcoming any tendency of the valve to stick to its seat. The lost motion between the diaphragm and the valve also has another very advantageous feature. It will be evident that it permits a considerable movement of the diaphragm before the valve opens. It, therefore, permits plenty of movement of the diaphragm for proper operation of the control switch 52 to insure the switch has its necessary and desirable movement, and is given sufficient movement to shift it to the desired position for effective operation.

As soon as the faucet is closed, pressure immediately builds up in the chamber 23 to equal that on the opposite side of the diaphragm 40. The diaphragm is then immediately shifted to the left by the springs 47. This movement, through the rod 50, will swing the switch 52 to the full line or open position of Fig. 1 thus opening the circuit through the relay 63 to immediately open the main switch 12 to prevent further heating of the water. As the diaphragm 40 is shifted to the left, valve 36 is closed by the spring 37. The restricted passage 38 in the valve 36 permits the pressures to equalize on opposite sides of this valve so that there is nothing to prevent the diaphragm 40 moving to the left to open the switch 52. The springs 47 are also a safety feature in that, should the water supply to the heater be cut off for any reason, these springs would immediately shift the diaphragm to the left to open the switch 52 and thus insure that the water is not further heated. This is because shutting off the water supply removes the pressure from the left hand side of the diaphragm 40 and it may, therefore, immediately be shifted by the springs 47.

Thus, with this device, as soon as any hot water faucet is opened, heat is immediately supplied to the heating device automatically and the temperature is automatically maintained substantially constant so long as the faucet remains open. As soon as the faucet is closed, the heating medium is immediately shut off. Also, should for any reason, the water supply fail, the heating medium is automatically shut off immediately. Although the differential pressure device and thermostat are shown as controlling the current supply to an electric heater, it will be understood they may be used for controlling other heating means such for instance as gas.

Having thus set forth the nature of my invention, what I claim is:

1. In a water heater, a heating device, inlet and outlet connections for the water to and from said device, a pressure operated motor in said outlet, a normally closed valve between the motor and the heating device in position to be operated by said motor, and means for controlling the heating device operated by said motor.

2. In a water heater, a heating device, an electrical device for controlling the operation of the heating device, a motor operated by water flow in the heater, a switch for controlling the electrical device and operated by said motor, a second switch for controlling said electrical device and connected in series with the first switch, and a thermostat responsive to water temperature changes for operating the second switch.

3. In a water heater, a water heating device, water inlet and outlet connections to and from said device, a movable diaphragm exposed on one side to the pressure in said outlet, a by-pass connection from the inlet to the other side of the diaphragm, and a control device for said heating device connected to said diaphragm.

4. In a water heater, a water heating device, water inlet and outlet connections to and from said device, a movable diaphragm exposed on one side to the pressure in said outlet, a by-pass connection from the inlet to the other side of the diaphragm, and a valve in the outlet between the heating device and the diaphragm and normally in closed position to prevent flow of water from the heater, said diaphragm being adapted to open said valve by a given movement of the diaphragm.

5. In a water heater, a heating device, inlet and outlet connections for the water to and from said device, a motor operated by differential pressures in said outlet, and a valve in the outlet between the heating device and the motor normally in closed position to prevent flow of water from the heater, said motor being adapted to open said valve by a given movement of the motor.

6. In a water heater, a heating device, inlet and outlet connections for the water to and from said device, a motor operated by differential pressures in said outlet, a valve in the outlet between the heating device and the motor normally in closed position to prevent flow of water from the heater, said motor being adapted to open said valve by a given movement of the motor, a control device for the heating device controlled by said motor, a second control device for the heating device in series with the first control device, and a thermostat in the outlet for operating the second control device.

7. In a water heater, a heating device, inlet and outlet connections for the water to and from said device, a motor operated by differential pressures in said outlet, a valve in the outlet between the heating device and the motor normally in closed position to prevent flow of water from the heater, said motor being adapted to open said valve after a predetermined movement of the motor, and a control device for the water heating device controlled by said motor.

8. In a water heater, a heating device, inlet and outlet connections for water to and from said device, a movable diaphragm exposed on one side to the pressure of water in the outlet, a by-pass connecting the inlet with the other side of the diaphragm and means operated by said diaphragm for controlling the operation of the heating device.

9. In a water heater, an electric heating device for the water, a switch for controlling current to said device, a relay for operating the switch, a control switch for the relay, inlet and outlet connections for water to and from said heating device, a movable diaphragm exposed on one side to pressure of water in the outlet, a by-pass connecting the inlet with the other side of the diaphragm, and an operative connection from the diaphragm to the relay control switch.

10. In a water heater, a heating device, inlet and outlet connections for water to and from said device, a movable diaphragm exposed on one side to the pressure of water in the outlet, a by-pass connecting the inlet with the other side of the diaphragm, a valve in the outlet between the heating device and the diaphragm and normally in the closed position to prevent flow of water from the device, means for opening said valve by movement of the diaphragm under pressure from the inlet, and means operated by said diaphragm for controlling the operation of the heating device.

11. In a water heater, an electric heating device for the water, a switch for controlling current to said device, a relay for operating the switch, a control switch for the relay, inlet and outlet connections for water to and from said heating device, a movable diaphragm exposed on one side to pressure of water in the outlet, a by-pass connecting the inlet with the other side of the diaphragm, a normally closed valve in the outlet between the heating device and the diaphragm and arranged to be opened by movement of said diaphragm under pressure from said inlet, and an operative connection from the diaphragm to the relay control switch.

12. In a water heater, a heating device, inlet and outlet connections for water to and from said device, a movable diaphragm exposed on one side to the pressure of water in the outlet, a by-pass connecting the inlet with the other side of the diaphragm, a normally closed valve in the outlet between the heating device and the diaphragm and arranged to be opened by movement of said diaphragm under pressure from the inlet, spring means tending to move the diaphragm in the opposite direction, and means operated by said diaphragm for controlling the operation of the heating device.

13. In a water heater, a heating device, inlet and outlet connections for water to and from said device, a metal well in said outlet exposed on its outer walls to the water therein, a thermostatic element in said well, mercury surrounding said element and in contact with the inner walls of the well, and means operated by said thermostatic element for controlling the operation of the heating device.

14. In a water heater, a heating device inlet and outlet connections for water to and from said device, a metal well in said outlet exposed on its outer walls to the water therein, a helical bimetal element in said well and secured thereto at one end, a rotatable rod secured to said element at the opposite end, mercury surrounding said element and in contact with the inner walls of the well, and means operated by said rod for controlling the operation of the heating device.

15. In a water heater, a heating device, inlet and outlet connections for water to and from said device, said outlet including a passage having a threaded opening thereto, a metal well in said passage threaded in said opening at its outer end, a plug threaded into the open end of said well, a helical bi-metal element in the well secured at one end to said plug, a rotatable rod passing through the plug and connected to the other end of the element, mercury surrounding the element and in contact with the inner walls of the well, and means operated by said rod for controlling the operation of the heating device.

16. In a water heater, a water heating device, water inlet and outlet connections to and from said device, a movable diaphragm exposed on one side to the pressure in said outlet, a by-pass connection from the inlet to the other side of the diaphragm, a normally closed valve in said outlet, means on said valve to cooperate with said diaphragm to open the valve, said means being spaced from the diaphragm to give a delayed operation of the valve, and a control device for said heating device connected to the diaphragm.

17. In a water heater, a heating device, inlet and outlet connections for the water to and from said device, a motor operated by differential pressures in said outlet, and a valve in the outlet between the heating device and the motor normally in closed position to prevent flow of water from the heater, said motor being adapted to open said valve, and there being a lost motion between the motor and the valve to give a delayed opening of the valve.

BURLING D. WELLS.